United States Patent
Clark et al.

(10) Patent No.: US 7,916,173 B2
(45) Date of Patent: Mar. 29, 2011

(54) METHOD FOR DETECTING AND SELECTING GOOD QUALITY IMAGE FRAMES FROM VIDEO

(75) Inventors: James David Clark, Fairlight (AU); George Politis, Ryde (AU); Peter William Mitchell Ilbery, Dundas (AU)

(73) Assignee: Canon Kabushiki Kaisha, Tokyo (JP)

( * ) Notice: Subject to any disclaimer, the term of this patent is extended or adjusted under 35 U.S.C. 154(b) by 1221 days.

(21) Appl. No.: 11/155,632

(22) Filed: Jun. 20, 2005

(65) Prior Publication Data
US 2005/0286802 A1    Dec. 29, 2005

(30) Foreign Application Priority Data

Jun. 22, 2004    (AU) ................ 2004903394

(51) Int. Cl.
*H04N 17/00* (2006.01)
*H04N 5/14* (2006.01)
*G06K 9/40* (2006.01)

(52) U.S. Cl. .............. 348/180; 348/701; 382/255
(58) Field of Classification Search .......... 348/700, 348/701, 180, 192, 189, 181, 722; 375/240.27, 375/240, 224–228; 382/255, 232, 286; 358/527; 702/69, 71, 81
See application file for complete search history.

(56) References Cited

U.S. PATENT DOCUMENTS

| | | | |
|---|---|---|---|
| 4,804,831 A | 2/1989 | Baba et al. ............ 250/201 |
| 4,888,646 A | 12/1989 | Umeda et al. ............ 358/464 |
| 5,191,416 A * | 3/1993 | Dickson et al. ........... 348/459 |
| 5,710,829 A * | 1/1998 | Chen et al. ............. 382/173 |
| 5,734,740 A * | 3/1998 | Benn et al. ............. 382/132 |
| 5,793,985 A * | 8/1998 | Natarajan et al. ......... 709/247 |
| 5,802,211 A | 9/1998 | King .................. 382/236 |
| 5,903,673 A | 5/1999 | Wang et al. ............ 382/236 |
| 5,920,349 A * | 7/1999 | Okino et al. ............ 348/354 |
| 5,956,026 A | 9/1999 | Ratakonda ............. 345/328 |
| 5,991,458 A * | 11/1999 | Kunitake et al. .......... 382/254 |
| 6,078,689 A * | 6/2000 | Kunitake et al. .......... 382/232 |
| 6,281,942 B1 | 8/2001 | Wang ................. 348/607 |
| 6,298,145 B1 | 10/2001 | Zhang et al. ............ 382/103 |
| 6,314,140 B1 * | 11/2001 | Shelby ............... 375/240.26 |

(Continued)

FOREIGN PATENT DOCUMENTS
EP    0 326 436 A2    8/1989
(Continued)

OTHER PUBLICATIONS

Mar. 12, 2007 Examiner's Report in Australian Patent Appln. No. 2005202715.

(Continued)

*Primary Examiner* — Victor Kostak
(74) *Attorney, Agent, or Firm* — Fitzpatrick, Cella, Harper & Scinto

(57) ABSTRACT

A method of determining a quality value for an image frame is disclosed. The method comprises dividing (in a step 202) the frame into a plurality of tiles (906) and determining attributes (in a step 206) of each said tile based upon pixel values of the tile, and pixel values of a corresponding tile of a preceding frame. The method then establishes (in steps 210, 212) the quality value of the frame by testing the tile attributes of the frame against pre-determined criteria. The method then defines (in a step 220) the quality value of the frame depending upon results of the testing.

36 Claims, 12 Drawing Sheets

U.S. PATENT DOCUMENTS

| | | | |
|---|---|---|---|
| 6,360,017 B1 | 3/2002 | Chiu et al. | 382/239 |
| 6,366,705 B1 | 4/2002 | Chiu et al. | 382/239 |
| 6,466,225 B1 | 10/2002 | Larkin et al. | 345/596 |
| 6,493,041 B1 | 12/2002 | Hanko et al. | 348/699 |
| 6,628,711 B1 * | 9/2003 | Mathew et al. | 375/240.12 |
| 6,670,963 B2 * | 12/2003 | Osberger | 345/629 |
| 6,879,716 B1 * | 4/2005 | Ishibashi | 382/166 |
| 7,184,100 B1 * | 2/2007 | Wilf et al. | 348/700 |
| 2001/0033620 A1 * | 10/2001 | Itokawa | 375/240.28 |
| 2001/0036307 A1 * | 11/2001 | Hanna et al. | 382/154 |
| 2003/0031368 A1 * | 2/2003 | Myler et al. | 382/228 |
| 2004/0012675 A1 * | 1/2004 | Caviedes | 348/180 |
| 2004/0022317 A1 | 2/2004 | Shin et al. | 375/240.08 |
| 2005/0036693 A1 * | 2/2005 | Prakash | 382/232 |
| 2005/0246433 A1 * | 11/2005 | Carrigan et al. | 709/223 |

FOREIGN PATENT DOCUMENTS

| | | |
|---|---|---|
| EP | 0 326 436 B1 | 10/1994 |
| WO | WO 97/25818 | 7/1997 |
| WO | WO 98/21893 | 5/1998 |
| WO | WO 99/51022 | 10/1999 |
| WO | WO 01/67742 A1 | 9/2001 |
| WO | WO 2004/004310 A2 | 1/2004 |

OTHER PUBLICATIONS

M.A. Smith and T. Kanade, "Video Skimming and Characterization Through the Combination of Image and Language Understanding Techniques", IEEE Computer Vision and Pattern Recognition (CVPR), San Juan, PR (1997), pp. 775-781.

Kentaro Dobashi, et al., "Camera Working Parameter Extraction for Constructing Video Considering Camera Shake", Proceedings of International Conference on Image Processing (2001), pp. 382-385.

Gregory J. Power, et al., "A Velocital Information Feature for Charting Spatio-Temporal Changes in Digital Image Sequences", Journal of Electrical Imaging, 8(2) (Apr. 1999), pp. 167-175.

* cited by examiner

NXM Tiles in image

METHOD FOR DETECTING AND SELECTING GOOD QUALITY IMAGE FRAMES FROM VIDEO

FIELD OF THE INVENTION

The present invention relates to image analysis and applications based upon this analysis, particularly based upon the detection of motion, image blur arising from imperfect focus, and image exposure.

BACKGROUND

Amateur "home" video footage often contains scenes of poor quality. Thus, for example, a significant amount of home video footage contains out-of-focus subject matter, over-exposed and under-exposed scenes, or excess camera motion. This is often the case even when the capture device is equipped with modern day intelligent camera features that simplify and enhance the filming process. Poor quality scenes not only degrade the overall integrity of the video subject matter, but can exacerbate the difficulty of searching for good quality images or frames from within the video footage. Extraction of good quality frames from a long sequence of video footage can be performed manually. However since current storage media can archive 3 or more hours of video footage, this is laborious and time consuming.

SUMMARY OF THE INVENTION

According to a first aspect of the invention, there is provided a method of determining a quality value of a frame, the method comprising the steps of:
  dividing the frame into a plurality of tiles:
  determining attributes of each said tile based upon (i) pixel values of the tile and (ii) pixel values of a corresponding tile of a preceding frame; and
  establishing the quality value of the frame by:
    testing the tile attributes of the frame against pre-determined criteria; and
    defining the quality value of the frame depending upon results of said testing.

According to another aspect of the invention, there is provided an apparatus for determining a quality value of a frame, the apparatus comprising:
  means for dividing the frame into a plurality of tiles:
  means for determining attributes of each said tile based upon (i) pixel values of the tile and (ii) pixel values of a corresponding tile of a preceding frame; and
  means for establishing the quality value of the frame comprising:
    means for testing the tile attributes of the frame against pre-determined criteria; and
    means for defining the quality value of the frame depending upon results of said testing.

According to another aspect of the invention, there is provided a computer program product having a computer readable medium having a computer program recorded therein for directing a processor to execute a method of determining a quality value of a frame, said computer program product comprising:
  code for dividing the frame into a plurality of tiles:
  code for determining attributes of each said tile based upon (i) pixel values of the tile and (ii) pixel values of a corresponding tile of a preceding frame; and
  code for establishing the quality value of the frame comprising:
    code for testing the tile attributes of the frame against pre-determined criteria; and
    code for defining the quality value of the frame depending upon results of said testing.

According to another aspect of the invention, there is provided a computer program for directing a processor to execute a method of determining a quality value of a frame, said computer program product comprising:
  code for dividing the frame into a plurality of tiles:
  code for determining attributes of each said tile based upon (i) pixel values of the tile and (ii) pixel values of a corresponding tile of a preceding frame; and
  code for establishing the quality value of the frame comprising:
    code for testing the tile attributes of the frame against pre-determined criteria; and
    code for defining the quality value of the frame depending upon results of said testing.

According to another aspect of the invention, there is provided a video frame selected from a sequence of video frames dependent upon a quality value of the frame, the frame being selected by a method of determining a quality value of a video frame, said method being applied to each frame in the sequence, said method comprising, in regard to a particular frame in the sequence, the steps of:
  dividing the frame into a plurality of tiles:
  determining attributes of each said tile based upon (i) pixel values of the tile and (ii) pixel values of a corresponding tile of a preceding frame; and
  establishing the quality value of the frame by:
    testing the tile attributes of the frame against pre-determined criteria; and
    defining the quality value of the frame depending upon results of said testing.

According to another aspect of the invention, there is provided a method of estimating quality of an image in a video, the video comprising a plurality of images, each image comprising a plurality of pixels, said method comprising the steps of:
  arranging, for a current image of said video, pixels of the current image into a plurality of tiles, each said tile containing a plurality of pixels;
  determining the number of the tiles of the current image having a defined characteristic; and
  estimating quality of the current image based on the number of said tiles having the characteristic as a proportion of the number of tiles in the current image.

According to another aspect of the invention, there is provided a method of selecting an image from a video comprising a plurality of images, each image comprising a plurality of pixels, and said method comprising the steps of:
  (a) performing, for each image of said plurality of images, the steps of:
    arranging pixels of the image into a plurality of tiles, each said tile containing a plurality of pixels;
    determining the number of the tiles of the image having a defined characteristic; and
    estimating quality of the image based on the number of said tiles having the characteristic as a proportion of the number of tiles in the image; and
  (b) selecting an image from said video in accordance with the estimated quality.

Other aspects of the invention are disclosed.

BRIEF DESCRIPTION OF THE DRAWINGS

One or more embodiments of the present invention will now be described with reference to the drawings, in which.

DESCRIPTION OF PREFERRED EMBODIMENT

Figure 1:
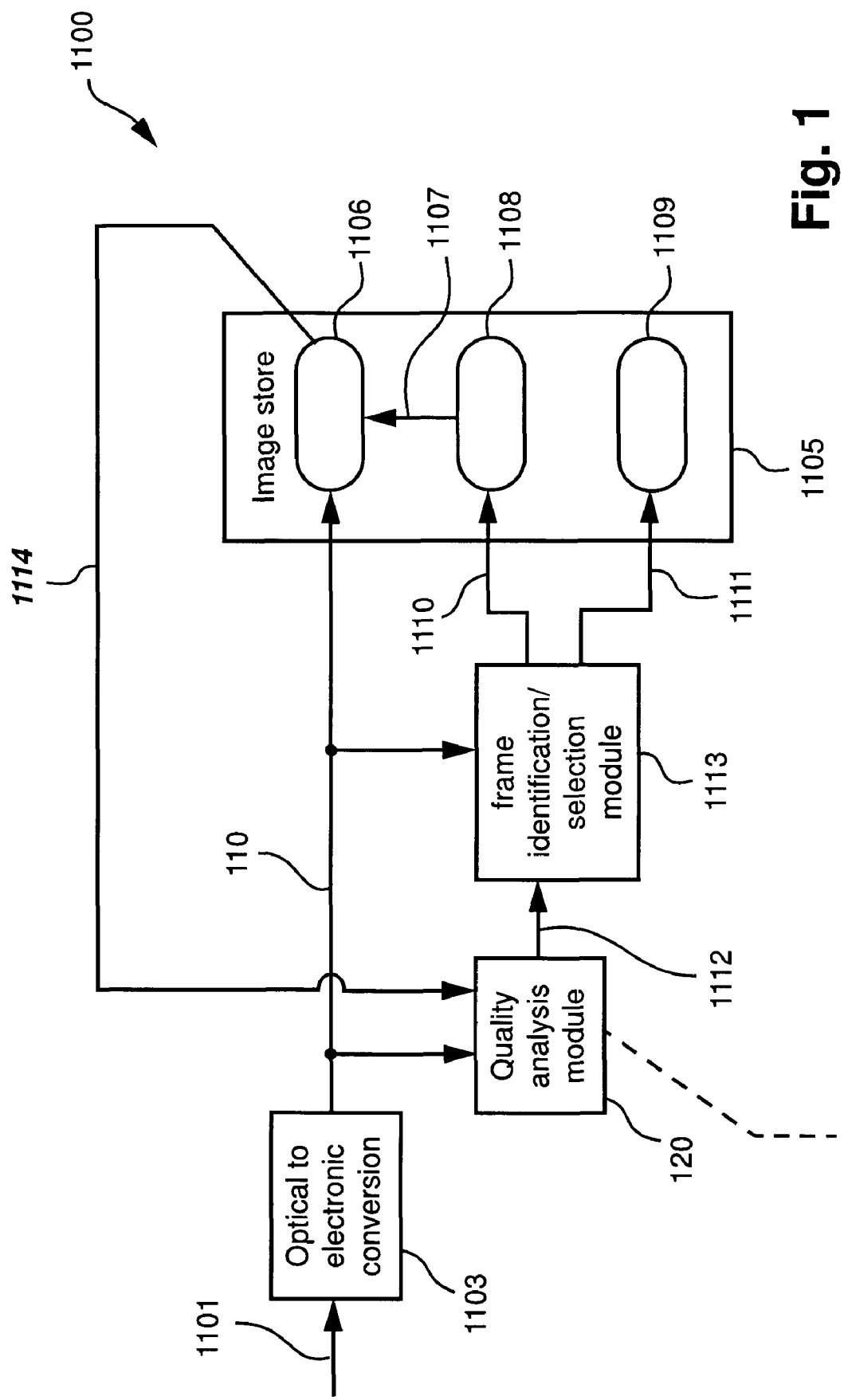
FIG. 1 is functional block diagram of a system for selecting good quality frames from a video data stream.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of processes or devices which form public knowledge through their respective publication and/or use. Such should not be interpreted as a representation by the present inventor(s) or patent applicant that such processes or devices in any way form part of the common general knowledge in the art.

The described arrangements assess individual frames in a video sequence of frames of image data on the basis of the quality of the frames. Each frame is divided into tiles of pixels, and the quality of the frame is assessed by estimating the amount of motion and the degree of focus within each tile, as well as the histogram of pixel luminance values within the frame. As will be described in relation to equations [9] and [15], provided that certain criteria are met, a tile can be analyzed for motion attributes to yield a motion magnitude $M_{MAG}$, and for focus attributes to yield a focus magnitude $F_{MAG}$.

Turning to the above-mentioned criteria, if the range of pixels in a particular tile is too small, the amount of detail discernable within that tile is too small to enable a meaningful analysis to be performed. In this case, meaningful estimates of motion magnitude $M_{MAG}$ or focus magnitude $F_{MAG}$ cannot be made. Furthermore, meaningful estimates of focus magnitude cannot be made if there is too much motion detected in a particular tile. In such cases, an estimation of focus blur is not meaningful, as additional effects will be introduced by motion blurring.

Tiles that do not have a meaningful motion or focus magnitude are classified as being "motion-undefined" or "focus-undefined" respectively. Conversely, tiles that do have a meaningful motion or focus magnitude are classified as being "motion-defined" or "focus-defined" respectively. A tile which is both "motion-defined" and "focus-defined" is classified as "known". If the motion magnitude is below a threshold of acceptable motion, and the focus magnitude is above a threshold of acceptable focus, the tile is classified as "good", and otherwise it is classified as "bad".

As will be described later, a frame is analyzed to determine whether it has acceptable exposure, being neither under-exposed nor over-exposed. This analysis uses an exposure metric, EM.

A frame is classified as being of "acceptable" or "unacceptable" quality. Classification of a frame as "acceptable" depends on three criteria: first, the proportion of known tiles must exceed a threshold; second, the proportion of good tiles must exceed a threshold; and third, the exposure metric must exceed a threshold. Additionally, each frame is assigned a quality metric, QM, that measures the overall quality of the frame. The quality metric is calculated from the exposure metric, EM, the proportions of "good" and "bad" tiles, and the focus magnitudes of the tiles that are "good".

Video frame images of the video stream 110 can be ranked by comparing their respective quality metric values QM. Unacceptable images, i.e., those images that do not meet the aforementioned criteria, may be discarded as soon as the frame fails one of the three criteria. This reduces the processing required to search video data for good frames.

FIG. 1 is functional block diagram of an embedded system in a video camera for selecting good quality frames from a video data stream. An optical signal 1101 is captured by an optical/electronic conversion module 1103 and converted to an electronic data stream 110 which is also referred to as the video data stream 110. The raw captured video footage contained in the stream 110 is stored in an onboard image store 1105 which can be removable, or fixed in which case the images can be downloaded to an external computer system 1000 (see FIG. 2) via a data port (not shown). A reference numeral 1106 depicts the stored raw captured video footage.

The disclosed arrangement for identifying good quality frames in an image stream processes the data stream 110 in a quality analysis module 120. The module 120 analyzes the data stream 110 in real time, and outputs quality information at 1112 to a frame identification/selection module 1113. According to one arrangement, the frame identification/selection module 1113 identifies, on the basis of the quality information 1112, good quality images which are then stored according to an arrow 1111 in the image store 1105 as depicted by 1109. According to another arrangement, the frame identification/selection module 1113 generates and stores, on the basis of the quality information 1112, meta-data pointers to good quality frames in the data stream 110. The module 1113 stores the pointers according to an arrow 1110 in the image store 1105. A reference numeral 1108 depicts the stored meta-data pointers. An arrow 1107 depicts the fact that the pointer meta-data 1108 points to images in the stored raw footage 1106.

According to another arrangement, the stored image data 1106 can be provided according to an arrow 1114 to the quality analysis module 120 for off-line post processing, instead of performing the identification of good quality images on the fly using the data stream 110.

The disclosed arrangement in FIG. 1 enables the operator of the video camera 1100 to operate a control (not shown) for an appropriate length of time in order to capture desired subject matter. In one arrangement, the captured sequence of images 110 is buffered in the memory store 1105 and subsequently processed (as depicted by the arrow 1114) to identify and select the "best" quality frame in that captured sequence 1106. In an alternate arrangement, the desired still image can be identified in the captured video data bit stream 1106, and the meta-data pointer can be inserted into metadata 1108 associated with the captured video data bit stream 1106. The pointer would point, as depicted by the arrow 1107, to the appropriate position in the stored data 1106 that corresponds to the video frame that is considered to be of good quality. The pointer(s) can be accessed from the video metadata 1109 for subsequent post-processing.

The disclosed arrangements increase the probability of capturing a better shot or image of the desired subject matter by providing a selection of candidate frames that can be processed for relative quality to thus identify the best frame capturing the desired subject matter.

Figure 2:
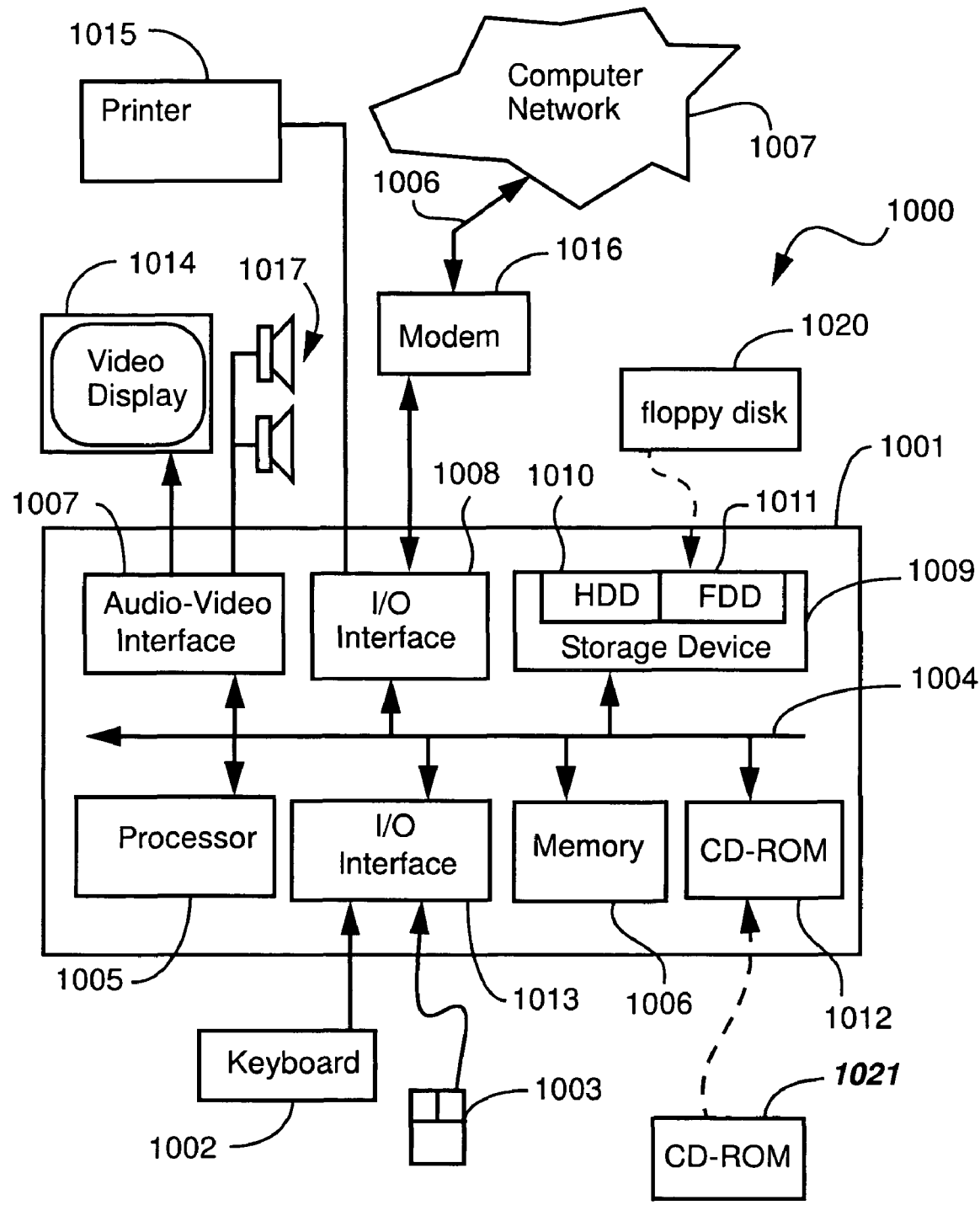
FIG. 2 is a schematic block diagram of a general purpose computer upon which the disclosed method can be practiced.

FIG. 2 shows an alternate arrangement which performs post-processing of the raw video footage 1106 from FIG. 1. In this arrangement the method of identifying good quality images is implemented as software, such as an application program, executing within a computer system 1000. In particular, the method steps of a method of identifying good quality images, as described in relation to FIGS. 3, 5, and 7-11 are effected by instructions in the software that are carried out by the computer. The instructions may be formed as one or more code modules, each for performing one or more particular tasks. The software may also be divided into two separate parts, in which a first part performs the methods for identifying good quality images and a second part manages a user interface between the first part and the user. The software may be stored in a computer readable medium, including the storage devices described below, for example. The software is loaded into the computer from the computer readable medium, and is then executed by the computer. A computer readable medium having such software or computer program recorded on it is a computer program product. The use of the computer program product in the computer preferably effects an advantageous apparatus for identifying good quality images.

The computer system 1000 comprises a computer module 1001, input devices such as a keyboard 1002 and mouse 1003, output devices including a printer 1015, a display device 1014 and loudspeakers 1017. A Modulator-Demodulator (Modem) transceiver device 1016 is used by the computer module 1001 for communicating to and from a communications network 1007, for example connectable via a telephone line 1006 or other functional medium. The modem 1016 can be used to obtain access to the Internet, and other network systems, such as a Local Area Network (LAN) or a Wide Area Network (WAN), and may be incorporated into the computer module 1001 in some implementations.

The computer module 1001 typically includes at least one processor unit 1005, and a memory unit 1006, for example formed from semiconductor random access memory (RAM) and read only memory (ROM). The module 1001 also includes an number of input/output (I/O) interfaces including an audio-video interface 1007 that couples to the video display 1014 and loudspeakers 1017, an I/O interface 1013 for the keyboard 1002 and mouse 1003 and optionally a joystick (not illustrated), and an interface 1008 for the modem 1016 and the printer 1015. In some implementations, the modem 1016 may be incorporated within the computer module 1001, for example within the interface 1008. A storage device 1009 is provided and typically includes a hard disk drive 1010 and a floppy disk drive 1011. A magnetic tape drive (not illustrated) may also be used. A CD-ROM drive 1012 is typically provided as a non-volatile source of data. The components 1005 to 1013 of the computer module 1001 typically communicate via an interconnected bus 1004 and in a manner that results in a conventional mode of operation of the computer system 1001 known to those in the relevant art. Examples of computers on which the described arrangements can be practiced include IBM-PCs and compatibles, Sun Sparcstations or like computer systems evolved therefrom.

Typically, the application program for identifying good quality images, and the media item files associated with the raw captured video footage 1106, are resident on the hard disk drive 1010 and read and controlled in its execution by the processor 1005. Intermediate storage of the program and any data fetched from the computer memory 1009 or the network 1007 may be accomplished using the semiconductor memory 1006, possibly in concert with the hard disk drive 1010. In some instances, the application program for identifying good quality images may be supplied to the user encoded on a CD-ROM 1021 or a floppy disk 1020 and read via the corresponding drive 1012 or 1011, or alternatively may be read by the user from the network 1007 via the modem device 1016. Still further, the software for identifying good quality frames can also be loaded into the computer system 1000 from other computer readable media. The term "computer readable medium" as used herein refers to any storage or transmission medium that participates in providing instructions and/or data to the computer system 1000 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1001. Examples of transmission media include radio or infra-red transmission channels as well as a network connection to another computer or networked device, and the Internet or Intranets including e-mail transmissions and information recorded on Websites and the like.

The method of identifying good quality frames may alternatively be implemented in dedicated hardware such as one or more integrated circuits performing the functions or sub functions of identifying good quality images. Such dedicated hardware may include graphic processors, digital signal processors, or one or more microprocessors and associated memories.

Figure 3:
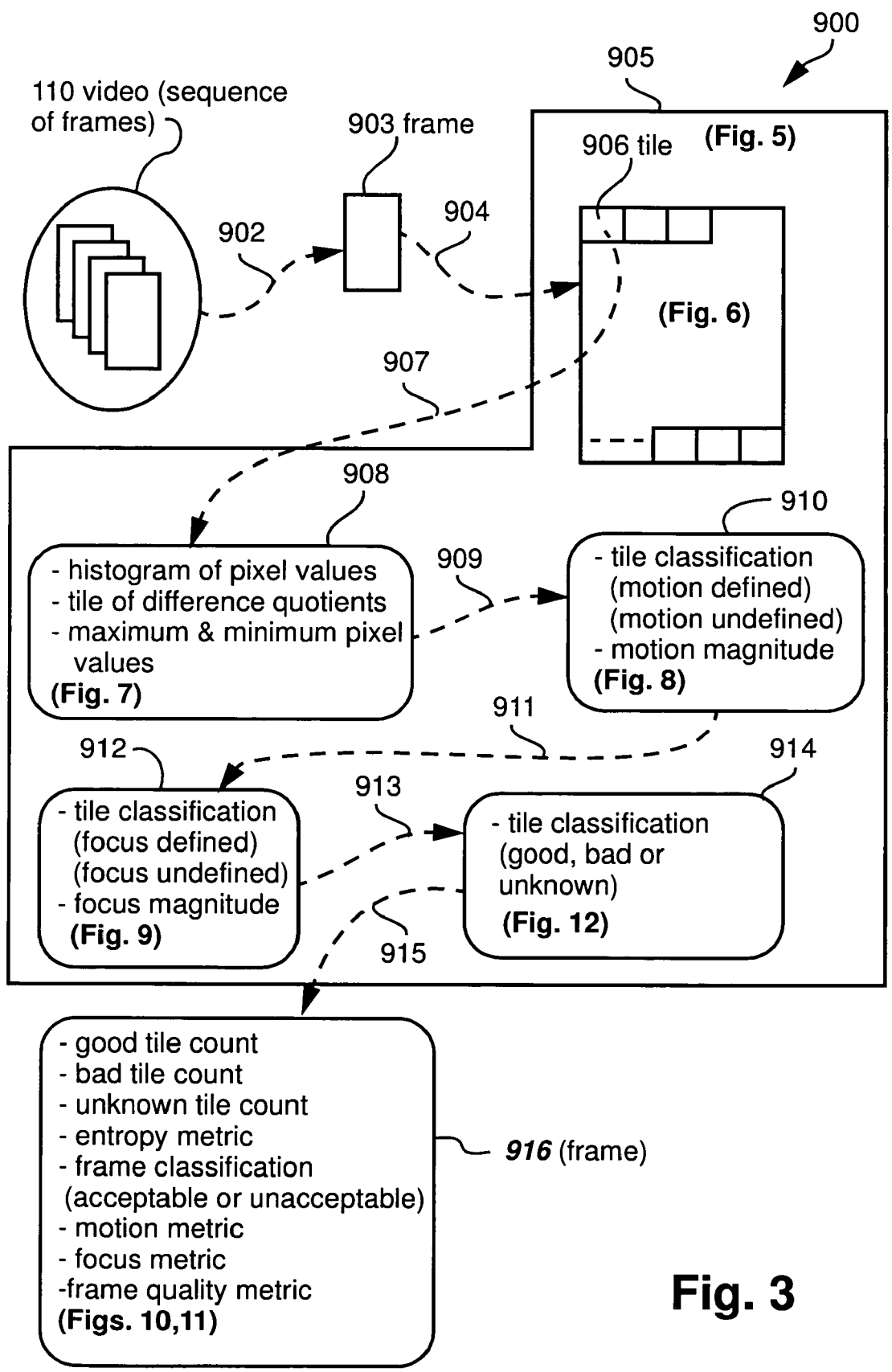
FIG. 3 shows the correspondence between sub-processes of the disclosed method and the associated drawings in this description.

FIG. 3 shows the correspondence between sub-processes of the disclosed method and the associated drawings in this description. Given the sequence of video frames 110, a particular frame 903 is considered, as depicted by a dashed arrow 902, and is subjected, as depicted by a dashed arrow 904, to an analysis process that is initially to be described in relation to FIG. 5. The frame 903 is tiled, in a manner to be described in relation to FIG. 6, and a tile 906 is processed, as depicted by a dashed arrow 907, to produce a histogram of pixel values, a tile of difference quotients, and maximum and minimum pixel values as will be described in relation to FIG. 7. The disclosed method then proceeds, as depicted by a dashed arrow 909, to perform tile classification in relation to "motion" attributes, as will be described in relation to FIG. 8. The disclosed method then proceeds, as depicted by a dashed arrow 911, to perform tile classification in relation to "focus" attributes, as will be described in relation to FIG. 9. The disclosed method then proceeds, as depicted by a dashed arrow 913, to perform tile classification as "good", "bad", or "unknown", as will be described in relation to FIG. 12. The aforementioned tile-based processes are repeated for all or most tiles in the frame 903, after which the disclosed method proceeds, as depicted by a dashed arrow 915, to determine frame based parameters as will be described in relation to FIG. 10.

Figure 4:
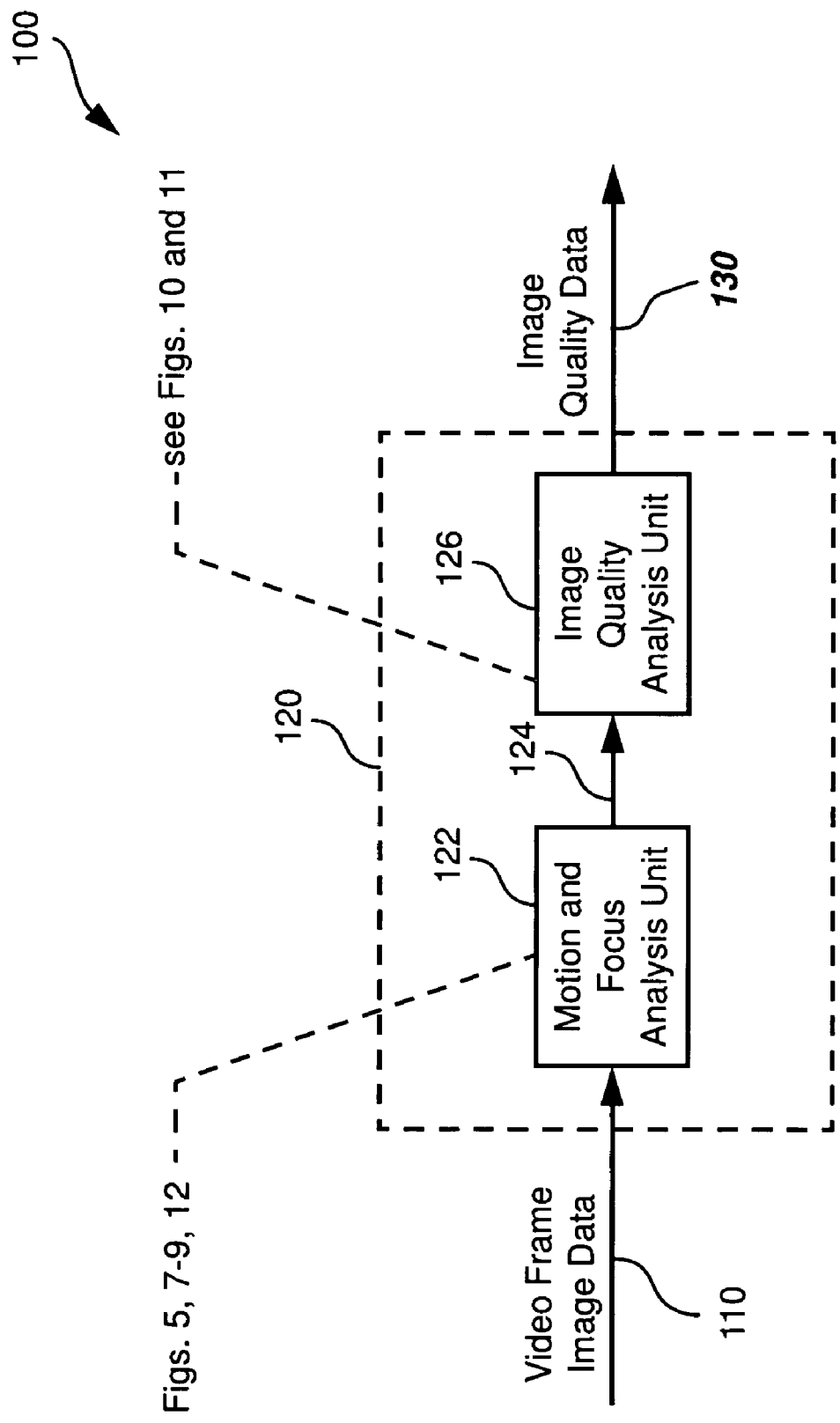
FIG. 4 shows a schematic block diagram of a system for detecting motion, focus and quality in video.

FIG. 4 shows a functional block diagram of the quality analysis module 120 which is used to detect attributes relating to motion, focus, and quality in the video stream 110. The video sequence 110, which comprises frames of image data, is analyzed in the quality analysis module 120. This analysis produces image quality data 130 which is output from the module 120 for each frame of the video 110. The input video frame image data 110 comprises an array of image pixel values for each frame. Each pixel of a frame in a typical video sequence has a number of color components, each component being represented by 8 bits of data. In the described arrangement, each pixel is represented by one 8-bit value, typically based upon the luminance channel (Y) of the video color space which may comprise YUV or YCbCr.

The data for the chrominance channels (U, V or Cb, Cr) are typically discarded in this arrangement. Retaining only the luminance component of a pixel ensures that the most important information (i.e., luminance) is used for analyzing motion and focus. Another benefit of this approach is that the quality processing of each frame of the input data 110 is simplified and fast, and the buffer requirements on the quality analysis module 120 are reduced.

Each frame of the video frame image data 110 is passed to a motion and focus analysis unit 122. In the unit 122 the frame is divided into tiles, and motion and focus data 124 is determined for each tile of the frame. The motion and focus data 124 for the frame is further processed in an image quality analysis unit 126. In the unit 126, the image quality data 130 is determined for the frame, based on the amount and distribution of the focus and motion information among the tiles within the frame.

Figure 5:
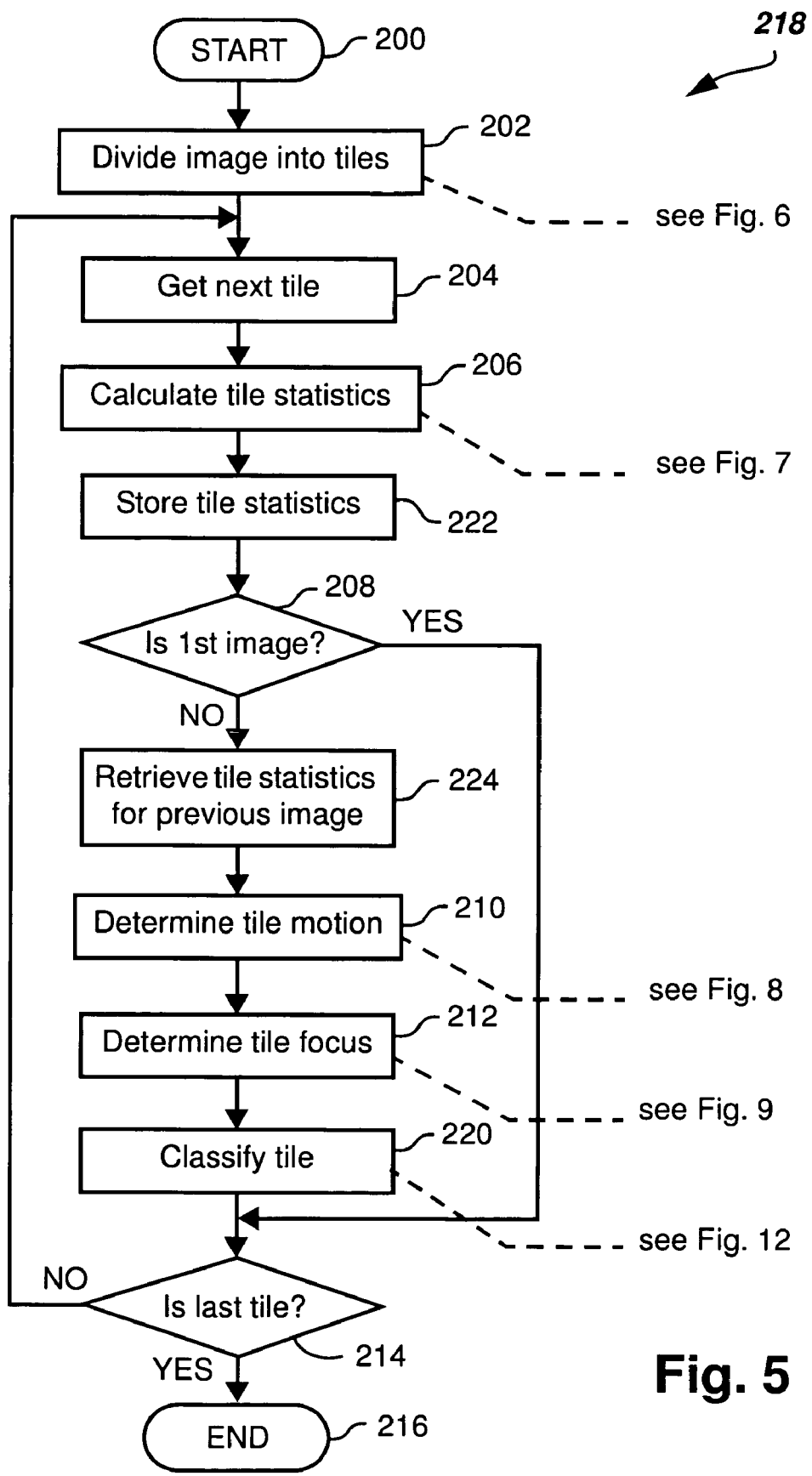
FIG. 5 shows a flow diagram of a method of calculating statistical data, motion data and focus data for each tile of tiled video frame image data in the motion and focus analysis unit 122 in FIG. 4.

FIG. 5 shows a flow diagram of a process 218 that determines statistical data, motion data and focus data for each tile of a current frame of the video frame image data 110. The motion and focus analysis unit 122 of FIG. 4 performs the process 218 for each frame it is given. The process 218 begins at a step 200. A following step 202 divides the current frame of the video data 110 into a plurality of tiles in a manner described in relation to FIG. 6. The step 204 acquires a current tile for processing. A following step 206 determines statistics for the current tile as is described in more detail in regard to FIG. 7. A following step 222 stores the statistics of the current tile, for later use.

If a subsequent testing step 208 determines that the frame currently being processed is the first frame in a sequence of frames of the video frame image data 110, then the process 218 proceeds to a decision step 214. This test relates to the fact that comparison with previous frames is performed in the disclosed method. If the frame being considered is the first frame of the video data stream 110, or alternately the first frame of a particular video shot in the stream, then comparison cannot be performed. If the step 214 determines that the current tile is not the last tile in the current frame, then the process 218 proceeds back to the step 204. If, however, the step 214 determines that the current tile is the last tile in the current frame, then the process 218 terminates at a step 216.

Returning to the step 208, if it is determined that the frame currently being analyzed by the motion and focus analysis unit 122 is not the first frame in a sequence of frames of the video frame image data 110, then the process 218 proceeds to a step 224 that retrieves the tile statistics of the corresponding tile in the previous video frame image. A following step 210 determines motion data for the current tile as is described in more detail in regard to FIG. 8. The process then proceeds to a step 212 that determines focus data for the current tile as described in more detail in regard to FIG. 9. After the tile focus data is calculated by the step 212, the process then proceeds to a step 220 that classifies the tile as "good", "bad", or "unknown", as described in more detail in regard to FIG. 12. After the tile classification is performed by the step 220, the process proceeds to a step 214.

If it is determined by the step 214 that the current tile is not the last tile in the current frame, then the method is directed to the step 204. Otherwise, if it is determined at the step 214 that the current tile is the last tile in the current frame, then the process 218 terminates at the step 216.

Figure 6:
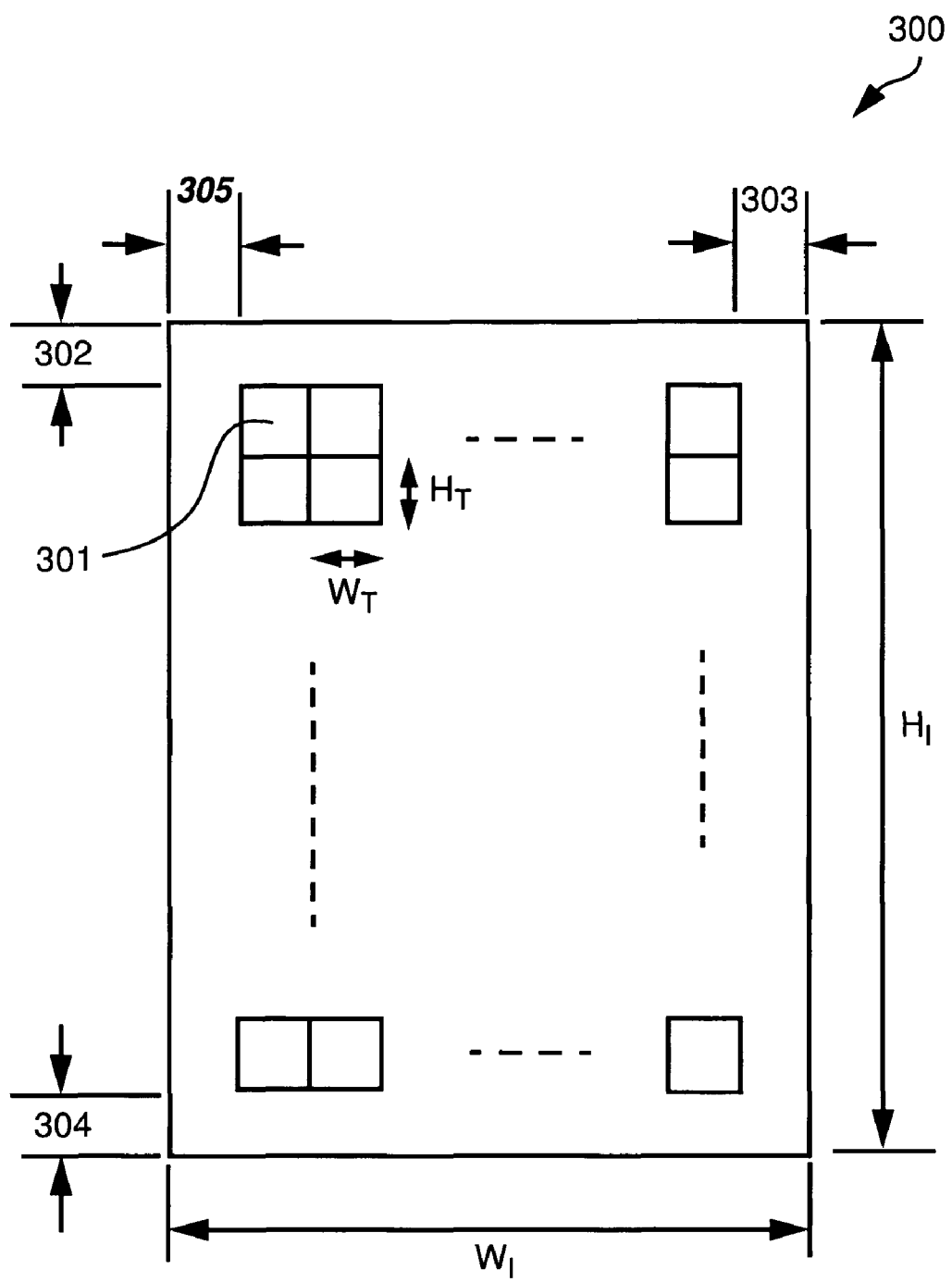
FIG. 6 shows a schematic diagram of a tiled video frame image comprising sample data from the luminance channel Y.

FIG. 6 is a schematic diagram of a tiled video frame 300 made up only from the luminance channel Y. The width and height of the video frame image 300, in units of pixels, are $W_1$ and $H_1$ respectively. Each tile 301 of the frame 300 comprises a fixed size rectangular array of pixels having a width $W_T$ pixels and a height $H_T$ pixels. The frame 300 is divided into N tiles across the width of the frame 300 and M tiles down the height of the frame 300, where $$N = \lfloor (W_1-3)/W_T \rfloor, \qquad [1]$$

$$M = \lfloor (H_1-3)/H_T \rfloor, \qquad [2]$$

and $\lfloor \ldots \rfloor$ is the floor operator. The floor operator applied to a number x (i.e., $\lfloor x \rfloor$) yields the largest integer less than or equal to x. Some pixels near the edges of the frame are not a part of any tiles, but instead are part of the frame border. Borders 302 and 305 of width two pixels are left between the top and left edges of the frame and the tiles in the frame. Borders 303 and 304 of width not less than one pixel are left between the bottom and right edges of the frame and the tiles in the frame.

Figure 7:
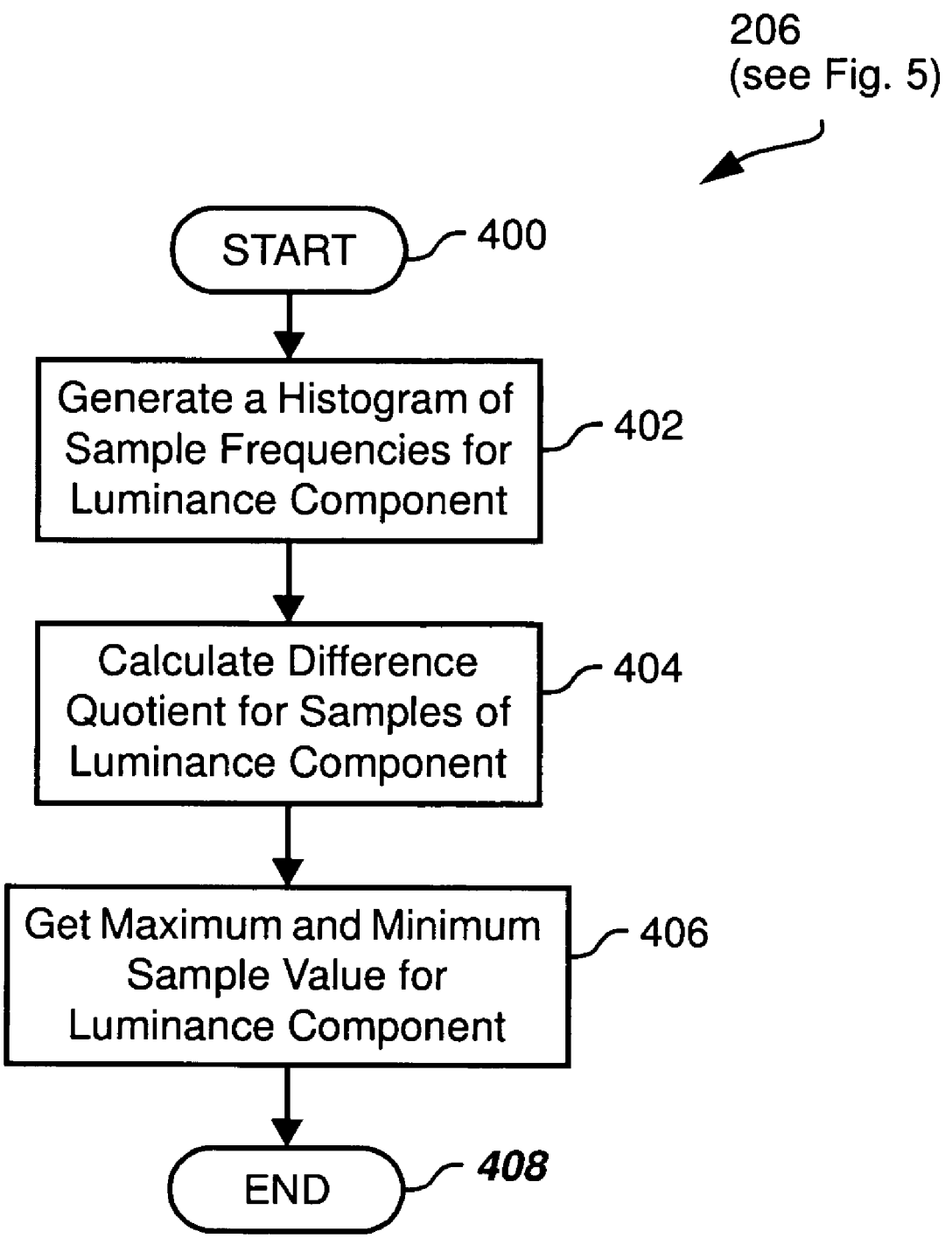
FIG. 7 shows a flow diagram of a method of calculating the statistical data of a tile at step 206 in FIG. 5.

FIG. 7 shows a flow diagram of the process 206 in FIG. 5 for determining statistical data for the current tile. The process 206 begins at a step 400. A following step 402 generates a histogram with $N_b$ bins for the luminance values of the tile pixels. In the typical case, luminance values are represented as 8-bit numbers, so that the possible luminance values lie in the range 0 to 255. Thus for $0 \leq i < N_b$, the value of the i-th histogram bin is the number of pixels in the tile that have luminance value in the range from $255i/N_b$ to $255(i+1)/N_b - 1$.

A following step 404 determines difference quotients $(D_V)_{i,j}$ and $(D_H)_{i,j}$, representing a measure of image focus, for each $0 \leq i < H_T$ and $0 \leq j < W_T$ as follows:

$$(D_V)_{i,j} = f(S_{i-2,j}, S_{y-1,j}, S_{i,j}, S_{i+1,j}) \qquad [3]$$

$$(D_H)_{i,j} = f(S_{i,j-2}, S_{i,j-1}, S_{i,j}, S_{i,j+1}) \qquad [4]$$

where $S_{i,j}$ is the value of the pixel with a displacement of i pixels vertically and j pixels horizontally from the top-left pixel in the current tile, and $f(x_0, x_1, x_2, x_3)$ is a function whose value is undefined if for any i=0, 1, 2, or 3, $x_1$ is greater than a threshold $T_H$; otherwise, if $|x_1 - x_2|$ is less than a threshold $T_W$, the value of $f(x_0, x_1, x_2, x_3)$ is 0; otherwise, the value is given by $$f(x_0, x_1, x_2, x_3) = \frac{|x_1 - x_2|}{|x_0 - x_1| + |x_1 - x_2| + |x_2 - x_3|} \qquad [4A]$$

Use of $T_H$ discards difference quotients in the vicinity of saturated pixels, where focus determination is unreliable. Use of $T_W$ discards difference quotients which may be large in value due to the presence of image noise.

Note that the values of the difference quotients $(D_V)_{i,j}$ and $(D_H)_{i,j}$ will depend on the values of pixels outside the current tile, which may lie in neighbouring tiles, or in the border. Note also that it can be shown that the values of $(D_V)_{i,j}$ and $(D_H)_{i,j}$ will always lie between 0 and 1.

At a following step 406, the maximum $S_{max}$ and minimum $S_{min}$ pixel luminance values of the current tile are obtained as follows:

$$S_{max} = \text{Max}(S_{i,j}) \quad [5]$$

$$S_{min} = \text{Min}(S_{i,j}) \quad [6]$$

where $S_{max}$ and $S_{min}$ are respectively the maximum and minimum pixel luminance values from $S_{i,j}$.

The process 206 terminates at a following step 408.

Figure 8:
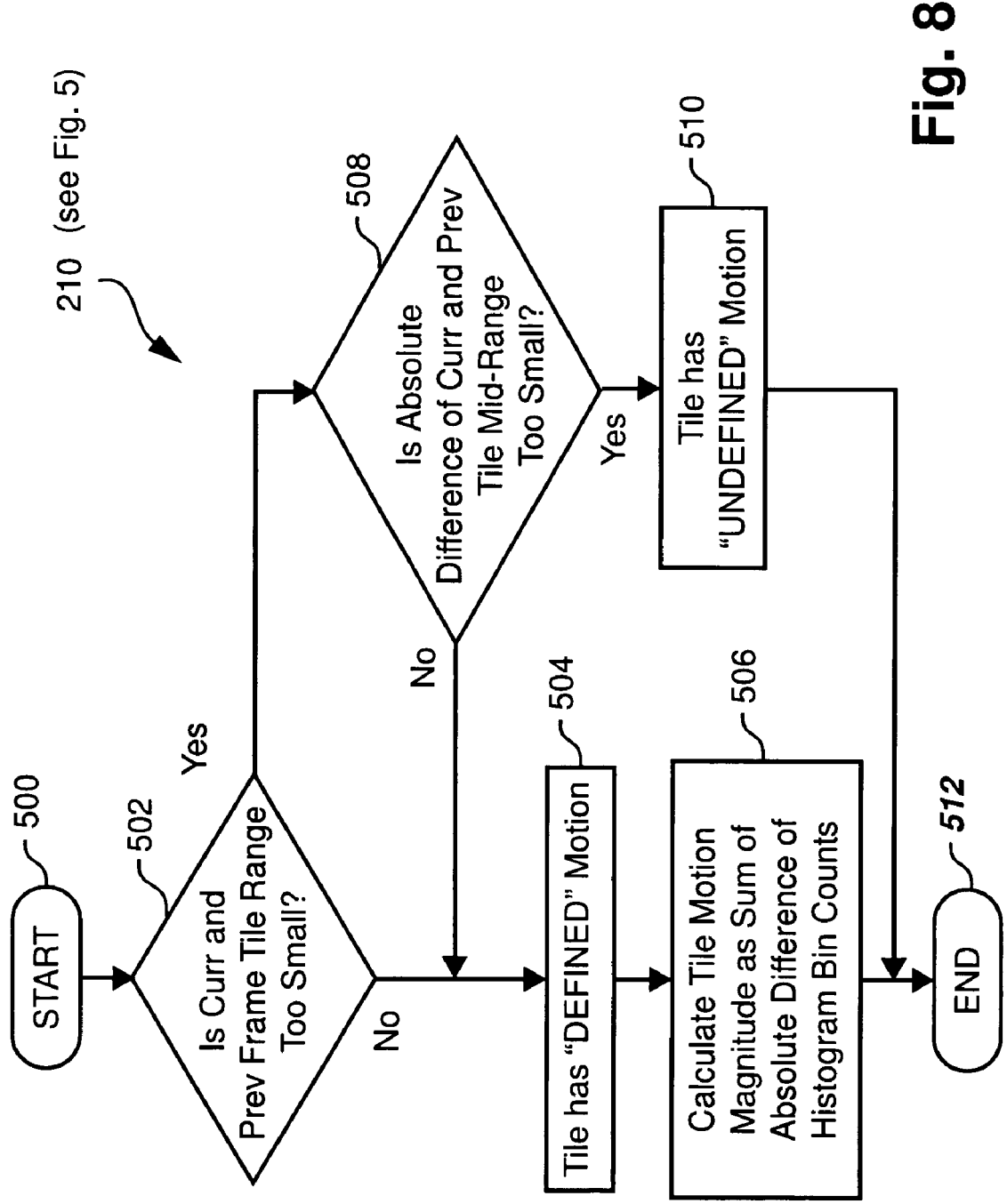
FIG. 8 shows a flow diagram of a method of calculating the motion data of a tile at step 210 in FIG. 5.

FIG. 8 shows a flow diagram of the process 210 for calculating the motion data of the current tile at the step 210 in FIG. 5. The process 210 begins at a step 500. A subsequent decision step 502 tests whether the luminance ranges of the current tile and the corresponding previous tile are not "too small". For the luminance ranges not to be too small, the Sample Value Range (SVR) for either of the current tile and the corresponding tile of the previous video frame must exceed a predefined luminance threshold $R_T$. This is expressed mathematically as follows:

$$SVR^c = S^c_{max} - S^c_{min} > R_T \quad [7] \text{ OR}$$

$$SVR^p = S^p_{max} - S^p_{min} > R_T \quad [8]$$

where:
$SVR^c$ and $SVR^p$ are the respective pixel value ranges for the current tile of the current and previous video frames;
$S^c_{max}$ and $S^p_{max}$ are the respective maximum pixel luminance values for the current tile of the current and previous video frames; and
$S^c_{min}$ and $S^p_{min}$ are the respective minimum pixel luminance values for the current tile of the current and previous video frames.

If the step 502 determines that the luminance range of one of the corresponding "current" tiles of the current video frame and the previous video frame is not "too small", i.e., at least one of the equations [7] and [8] is satisfied, then the process 210 proceeds to a step 504 that classifies the current tile of the current frame as having "defined" motion, i.e., as being "motion defined". Otherwise, if the luminance range of one of the corresponding "current" tiles of the current video frame and the previous video frame is found to be too small, i.e., neither one of the Equations [7] and [8] are satisfied, then the process 210 proceeds to a step 508. The step 508 determines if the absolute value of the difference of Mid-Range pixel Values (MRV) for the corresponding "current" tiles of the current and previous frame is not "too small". For the absolute value of the difference of Mid-Range pixel Values not to be too small, the absolute value in Equation [10] must exceed the predetermined mid-range difference threshold $MR_T$ as follows:

$$|MRV^c - MRV^p| > MR_T \quad [10]$$

where:

$$MRV^c = (S^c_{max} + S^c_{min})/2 \quad [11]$$

$$MRV^p = (S^p_{max} + S^p_{min})/2 \quad [12]$$

and:
$MRV^c$ and $MRV^p$ are the respective Mid-Range pixel Values for the current tile of the current and previous video frames;

$S^c_{max}$ and $S^p_{max}$ are the respective maximum pixel luminance values for the current tile of the current and previous video frames; and
$S^c_{min}$ and $S^p_{min}$ are the respective minimum pixel luminance values for the current tile of the current and previous video frames.

If the absolute value of the difference between the mid-range values of the corresponding current tiles is not too small, i.e., if the Equation [10] is satisfied, then the process 210 proceeds to the step 504. Otherwise, if at the step 508 the Equation [10] is not satisfied then the process 210 proceeds to a step 510 that classifies the current tile of the current video frame as having "undefined" motion. In this case it is not possible to determine whether any motion has occurred, because the subject matter in that tile contains no detail. Even if the subject moved, there may be no discernable change. The process 210 is then directed to the terminating step 512.

A step 504 classifies the current tile of the current frame as having "defined" motion, i.e., as being "motion defined". The motion magnitude $M_{MAG}$ for the current tile is then determined by a following step 506 as follows:

$$M_{MAG} = \sum_i^{N_b} |H_i^c - H_i^p| \quad [9]$$

where:
$M_{MAG}$ is the motion magnitude for the current tile;
$N_b$ is the number of histogram bins, as previously described in reference to FIG. 7; and
$H_i^p$ and $H_i^c$ are the i-th histogram bins of the current and previous video frame histograms.

The process 210 then proceeds to terminating step 512.

Apart from calculating a measure of motion, Equation [9] has an additional advantage that $M_{MAG}$ will increase when lighting changes, due to either a change in scene brightness or camera exposure. This will have the effect that frames during which lighting is changing are more likely to be discarded.

Figure 9:
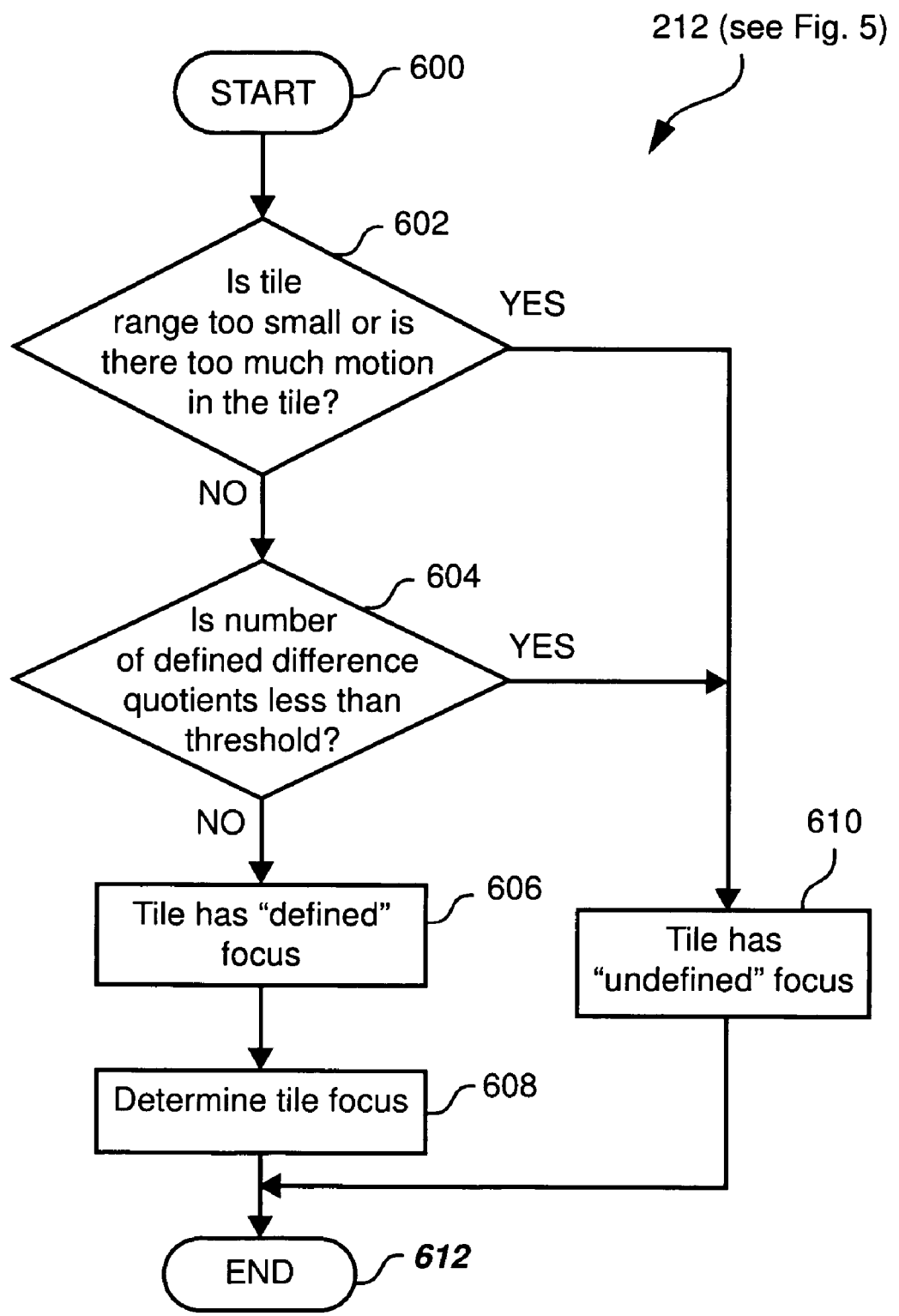
FIG. 9 shows a flow diagram of a method of calculating the focus data of a tile at step 212 in FIG. 5.

FIG. 9 shows a flow diagram of the process 212 for determining focus data of the current tile at the step 212 in FIG. 5. The process 212 begins at a step 600. A following step 602 determines if either (i) the Sample Value Range (SVR) of the current tile is less than the predetermined luminance threshold $R_T$ (see Equations [7] and [8]) or (ii) there is too much motion in the current tile. The requirement "too much motion" requires that the current tile be "motion defined" AND the also that motion magnitude $M_{MAG}$ (see equation [9]) exceed a pre-determined motion blur threshold $MB_T$. Thus for the answer in step 602 to be YES, either (A) the following equation [13] must be satisfied OR (B) the current tile must have defined motion according to the step 504 in FIG. 8 AND Equation [14] must be satisfied:

$$SVR^c = S^c_{max} - S^c_{min} < R_T \quad [13]$$

OR $$M_{MAG} = \sum_i^{N_b} |H_i^c - H_i^p| > MB_T \quad [14]$$

where:
SVR$^c$ is the sample value range of the current tile;
$M_{MAG}$ is the motion magnitude of the current tile of the current frame relative to the corresponding "current" tile of the process frame; and
$MB_T$ is the predetermined motion blur threshold.

If the answer in step 602 is NO, then a following step 604 determines if the number of difference quotients, $(D_V)_{i,j}$ and $(D_H)_{i,j}$, that are defined is less than a threshold $T_M$.

If the answer in step 604 is NO, a following step 606 classifies the current tile as having "defined" focus, i.e., as being "focus defined". Following step 606, a step 608 calculates the focus magnitude $F_{MAG}$ for the present tile to be the average of the $T_N$ largest difference quotients in the present tile, where $T_N$ is a constant parameter, i.e., $$F_{MAG} = \frac{1}{T_N} \sum_{n=1}^{T_N} x_n \quad [15]$$

where the $x_n$ are the largest $T_N$ values of $(D_V)_{i,j}$ and $(D_H)_{i,j}$. Since $(D_V)_{i,j}$ and $(D_H)_{i,j}$ have values between 0 and 1, $F_{MAG}$ also has a value between 0 and 1.

The process 212 is then directed to a termination step 612.

Returning to the steps 602 and 604, if the answers to either of these steps is YES, then the process 212 proceeds to a following step 610, which attributes the current tile with "undefined" focus. The process 212 then proceeds to a termination step 612.

In the described arrangement, tiles that contain "too much" motion are classified as "focus-defined" because the focus calculations for each tile should result from focus blur only, and not motion blur. Motion may lead to high difference quotients which may falsely indicate sharp (i.e., not blurred) image features.

Figure 12:
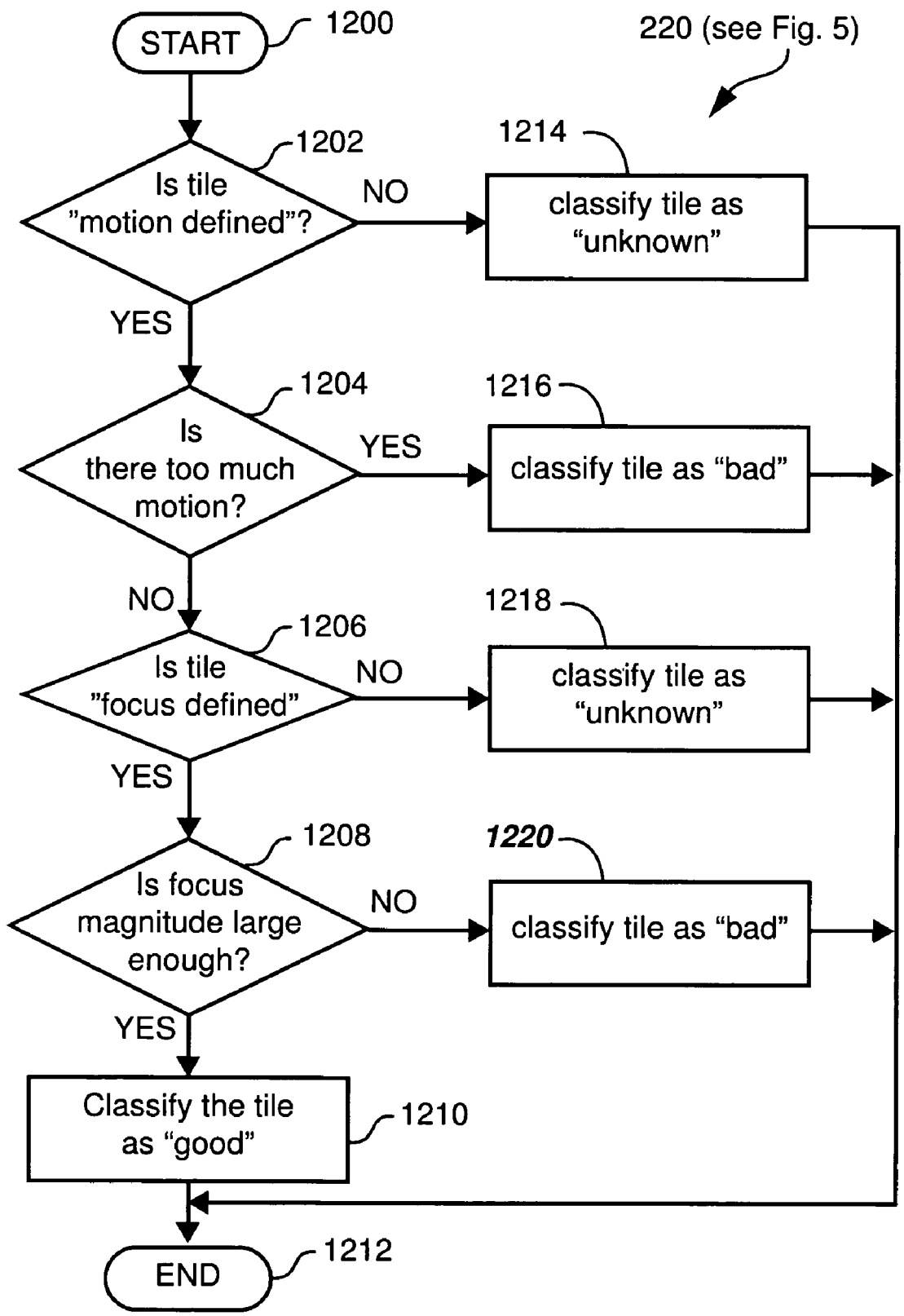
FIG. 12 shows a flow diagram of a method of classifying a tile at step 220 in FIG. 5.

FIG. 12 shows a flow diagram of the process 220 for classifying the current tile as either "good", "bad", or "unknown" at the step 220 in FIG. 5. The process 220 begins at a step 1200. A following step 1202 checks whether the tile has "defined" motion. If the result is NO, a following step 1214 classifies the current tile as "unknown" quality. The process is then directed to a terminating step 1212.

Returning to the step 1202, if the result is YES, then the process proceeds to a following step 1204. The step 1204 checks whether the tile has too much motion, by checking whether the motion magnitude $M_{MAG}$ exceeds the predetermined motion blur threshold $MB_T$. (See Equation [14].) Thus, for the step 1204 to be YES, Equation [16] must be satisfied:

$$M_{MAG} \geq MB_T \quad [16]$$

If the step 1204 is YES, a following step 1216 classifies the tile as "bad" quality. The process is then directed to a terminating step 1212.

Returning to the step 1204, if the result is NO, then the process proceeds to a following step 1206. The step 1206 checks whether the tile has "defined" focus. If the result is NO, a following step 1218 classifies the tile as "unknown" quality. The process is then directed to a terminating step 1212.

Returning to the step 1206, if the result is YES, then the process proceeds to a following step 1208. The step 1208 checks whether the tile has an acceptably large focus magnitude $F_{MAG}$. This occurs when the focus magnitude is larger than a predetermined focus blur threshold FBT, that is, when $$F_{MAG} \geq FB_T \quad [17]$$

If the step 1208 is NO, then a following step 1220 classifies the tile as "bad" quality. The process is then directed to a terminating step 1212.

Returning to the step 1208, if the result is YES, then the process proceeds to a following step 1210 which classifies the tile as "good" quality. The process is then directed to a terminating step 1212.

Returning to FIG. 4, the motion and focus data 124 that is generated by the motion and focus analysis unit 122, according to the processes described in relation to FIGS. 5, 7-9, and 12, is further analyzed by the image quality analysis unit 126. In the described arrangement, the data 124 typically comprises, for each tile in the current frame, (a) a classification of each tile as being good, bad, or unknown; and (b) the focus magnitude value $F_{MAG}$, if it is defined.

Figure 10:
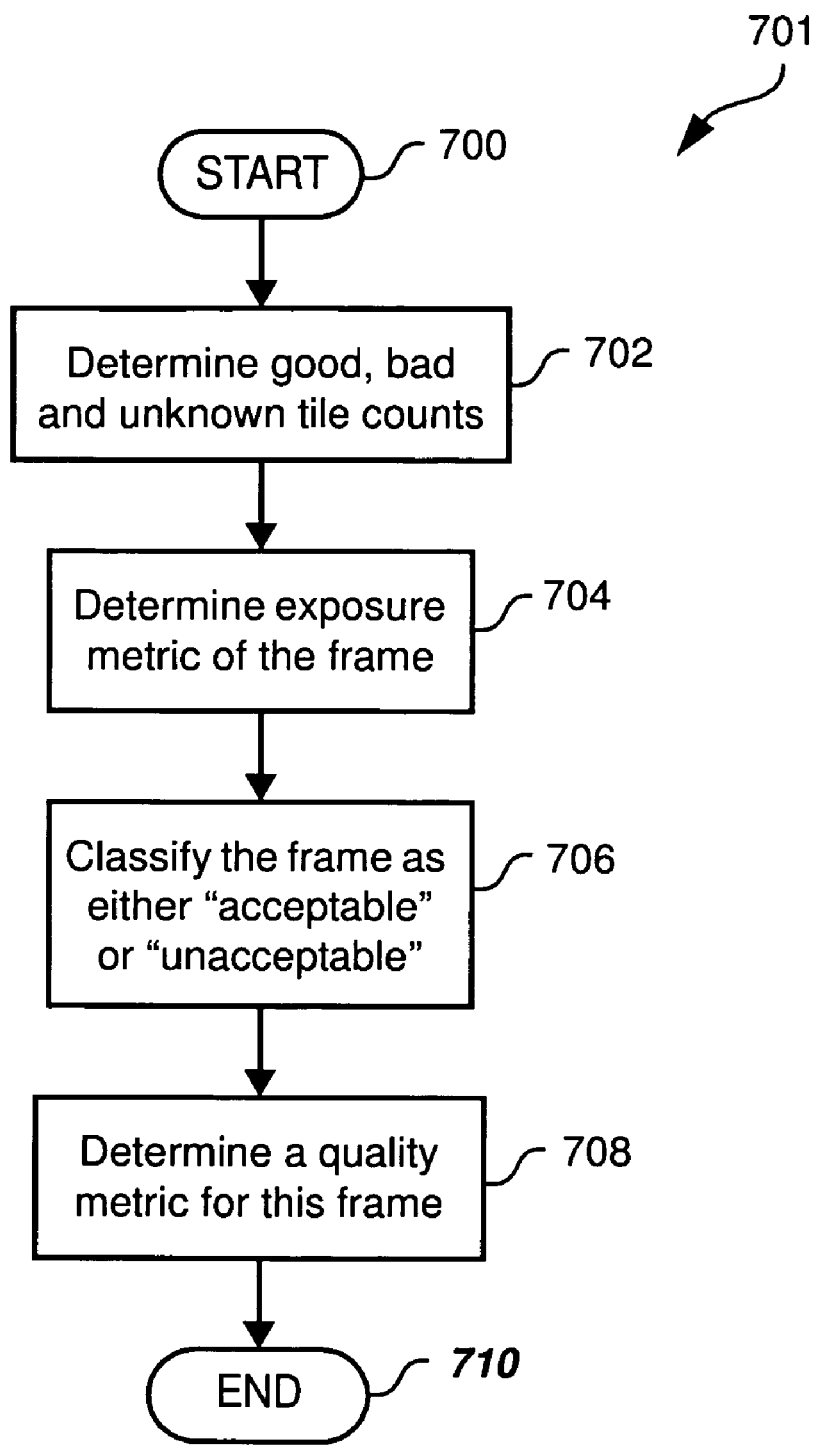
FIG. 10 shows a flow diagram of a method of calculating image quality data of a tiled image in the image quality analysis unit 126 in FIG. 4.

FIG. 10 shows a flow diagram of a process 701 for calculating image quality data 130 for the current video frame using the motion and the focus data 124 that is produced by the motion and focus analysis unit 122 in FIG. 4. The process 701 is performed by the image quality analysis unit 128. The process 701 begins at a step 700. A following step 702 determines the number of "good" tiles in the current frame. This number is hereinafter referred to as the Good Tile Count, $N_{GOOD}$. Similarly, the step 702 also determines the number of "bad" tiles in the current frame. This number is hereinafter referred to as the Bad Tile Count, $N_{BAD}$. Additionally, the step 702 also determines the number of "unknown" tiles in the current frame. This number is hereinafter referred to as the Unknown Tile Count, $N_{UNKNOWN}$.

A following step 704 determines, for the current frame, an exposure metric value, EM. The exposure metric is intended to measure the extent to which the frame is suitably exposed, in other words, whether the brightness and contrast levels are suitable. This is achieved by calculating the entropy of the image luminance values. The step calculates a luminance histogram $f_Y(y)$ for the current frame, and uses $f_Y(y)$ to set the exposure metric value to be a measure of the entropy of the luminance of the current frame. In regard to (a), a luminance histogram counts the number of pixels with each luminance value. The pixel luminance values are typically 8-bit integers, i.e., integers in the range from 0 to 255. Thus, the luminance histogram $f_Y(y)$ is defined for y=0, 1, . . . , 255 as follows:

$f_Y(y)$=the number of pixels whose luminance value is y. [18]

In regard to (b), an entropy measure of the luminance channel can be calculated by: summing the values of $$f_Y(y) \log(f_Y(y)) \quad [18A]$$

for each y=0, 1, . . . , 255; dividing this number by the number of pixels in the frame, $n_Y$ say; subtracting the result from $\log(n_Y)$; and diving by log 256. The exposure metric, EM, is set to the result of this calculation. Thus, $$EM = \frac{1}{\log 256}\left(\log(n_Y) - \frac{1}{n_Y}\sum_{y=0}^{255} f_Y(y)\log(f_Y(y))\right) \quad [19]$$

It can be shown that the value of EM will always lie between 0 and 1.

Many other exposure metrics are known in the art, and could be used here. For example, the exposure metric EM could be calculated as the deviation from a uniform histogram, thus:

$$EM = \sum_{y=0}^{255} |f_Y(y) - f_{av}|  \quad [19A]$$

where $f_{av}$ is the average frequency $n_y/256$.

A following step 706 classifies the current frame as either "acceptable" or "unacceptable". There are three criteria that must be met if the frame is to be considered "acceptable". If the frame does not meet all of the criteria, then it is classified "unacceptable". The criteria are as follows.

First, the ratio of the number of "unknown" tiles to the total number of tiles must be less than a predetermined threshold $T_{UNKNOWN}$, i.e., $$\frac{N_{UNKNOWN}}{N_{UNKNOWN} + N_{GOOD} + N_{BAD}} < T_{UNKNOWN} \quad [19B]$$

Second, the ratio of the number of "bad" tiles to the number of known tiles (i.e., tiles that are not "unknown") must be less than a predetermined threshold $T_{BAD}$, i.e., $$\frac{N_{BAD}}{N_{GOOD} + N_{BAD}} < T_{BAD} \quad [19C]$$

Third, the exposure metric, EM, must exceed a predetermined threshold $T_{EM}$, i.e., $$EM > T_{EM} \quad [19D]$$

If all three of the criteria are satisfied, the frame is classified as "acceptable". Conversely, if any of the three criteria are unsatisfied, the frame is classified "unacceptable".

A following step 708 calculates a quality metric, QM, for the current frame. The quality metric consists of three parts, first a exposure metric, EM, calculated in step 704, second a motion metric, MM, described below, and third a focus metric, FM, also described below.

As a motion metric for the frame, MM, the step 708 calculates the ratio of the number of "good" tiles, $N_{GOOD}$, to the number of known tiles (i.e., the number of tiles that are not "unknown"). Thus, $$MM = \frac{N_{GOOD}}{N_{GOOD} + N_{BAD}} \quad [20]$$

The value of MM will always lie between 0 and 1.

As a focus metric for the frame, FM, the step 708 calculates the average of the focus magnitudes, $F_{MAG}$, of the "good" tiles. Thus, $$FM = \frac{1}{N_{GOOD}} \sum_{i=1}^{N_{GOOD}} X_i \quad [21]$$

where the $X_i$ are the focus magnitudes, $F_{MAG}$, of each of the "good" tiles. Note that FM will always have a value between 0 and 1.

After the step 708 has calculated the values of MM and FM, the step 708 calculates the quality metric, QM, for the current frame, which is a weighted average of the exposure metric, the motion metric, and the focus metric. Thus, $$QM = w_{EM}EM + w_{MM}MM + w_{FM}FM \quad [22]$$

where $W_{EM}$, $w_{MM}$, and $W_{FM}$ are positive weights whose sum is 1. Typically, $W_{EM}$, $w_{MM}$ and $w_{FM}$ will all equal ⅓. The value of QM will always lie between 0 and 1.

Returning to FIG. 10, following completion of the step 708, the process 701 terminates at a step 710.

Returning to FIG. 4, the image quality data 130 that is output from the quality analysis module 120 has, for each frame, a classification of either "acceptable" or "unacceptable", and also a quality metric value, QM, between 0.0 and 1.0. A value of 0.0 represents a frame with the lowest or worst quality metric value QM or rating. A value of 1.0 represents a frame with the highest or best quality metric value QM or rating.

In an alternative arrangement, sub-regions of some or all the video frames are analyzed for "good" quality. In relation to operations requiring a comparison with data from previous frames, this approach involves comparing a current sub-region of a current frame with a corresponding sub-region of a previous frame.

For a given frame, the sub-region that contains the "best" quality rating $(QR)_R$ is selected as a "good" quality region of the particular image. Preferably, the sub-regions are rectangular and are an integer number of tiles in height and width, and each image sub-region tile corresponds with a video frame image tile. Defining the "best" quality rating for a sub-region typically requires balancing the quality metric for that sub-region $(QM)_R$ against the size of the selected sub-region $(S)_R$. This can be expressed, in one example as follows:

$$(QR)_R = W_{QMR} \times (QM)_R + W_{SR} \times (S)_R \quad [23]$$

where $W_{QMR}$ and $W_{SR}$ are weighting factors establishing the relative importance of the sub-region quality and the sub-region size. The value of $(QR)_R$ is then maximized for different sub-region rectangle sizes and positions within the corresponding video frame image. For example, the maximum value of $(QR)_R$ could be found by exhaustive search.

In an alternative arrangement, the method of analyzing the quality of a frame from the video frame image data 110 not only utilizes the data 124 generated by the motion and focus analysis unit 122 of the preferred arrangement, but also utilizes utilizes additional information relating to the spatial distribution of motion and/or focus defined tiles in each frame. The alternative arrangement operates in substantially the same manner as the arrangement described in relation to FIG. 4, differing only in the method for calculating the image quality data 130 in the image quality analysis unit 126.

Figure 11:
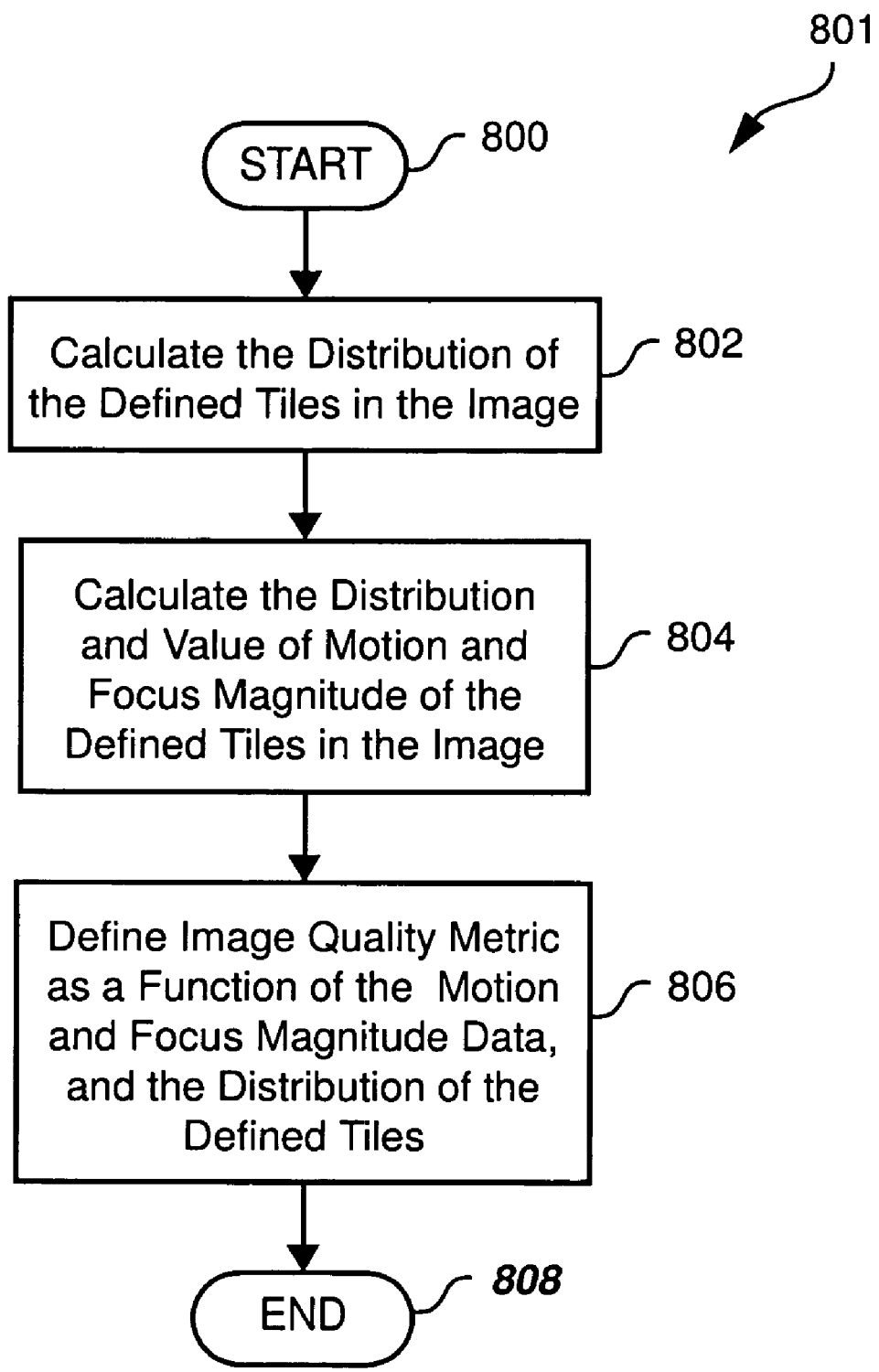
FIG. 11 shows an alternative embodiment of a flow diagram of a method of calculating image quality data of a tiled image in the image quality analysis unit 126 in FIG. 4.

FIG. 11 shows an alternative flow diagram of a method 801 for calculating image quality data of a tiled frame in the image quality analysis unit 126 in FIG. 5. FIG. 11 shows the method 801 which is an alternate method to the method 701 in FIG. 10. The method 801 begins at a step 800. A next step 802 determines, across the current video frame, the spatial distribution of tiles that have been classified as having "defined" motion and focus. In this manner, an array of classification values indicating the "defined" status of each tile, together with a parameter indicating the relative location of that tile within the image, is obtained for each frame of the video frame image data 110. At a next step 804, the respective motion and focus magnitude values $M_{MAG}$ and $F_{MAG}$ of each tile are incorporated into the array. The array is then buffered for subsequent processing. The aforementioned array process is performed for each frame of the video frame image data 110.

A following step 806 determines the motion metric MM, the focus metric FM, and the exposure metric EM, for each frame. In this arrangement, a user may specify a sub-region of the frame as being especially significant. For example, the user may specify the top-left quarter of the video frame. The motion, focus, and exposure metrics for the current frame are modified so that in Equations [20], [21], and [19], only the tiles that lie inside the user-specified sub-region are considered. The frame is then classified as acceptable or unacceptable, and a quality metric is calculated as described before. The process 801 then proceeds to a terminating step 808.

In another arrangement, in calculating the focus metric FM for the current frame, the Equation [21] is modified so that the focus magnitude $F_{MAG}$ of each tile is weighted depending on the distance of the tile in question to the centre of the current frame. For instance, a tile at the centre of the frame can have a focus magnitude weighting of 1.0, whereas a tile on the border of the frame can have a weighting of 0.0, with all tiles located between the border and centre of the frame being given an appropriate weighting value for the focus magnitude.

In another arrangement, an alternative image quality metric QM is calculated by the step 806. The Equation [22] is modified so that the quality metric value QM is defined as a function of (a) the distribution of the defined tiles and (b) the distribution and value of the associated motion and focus magnitude values. One definition of the quality metric value QM for this alternate arrangement is to assign a weighting to the respective motion and focus metric values MM and FM, and also to include the dependence of the spatial distribution of the defined tiles within the image, as follows:

$$QM=W_S\times(W_M\times(1.0-MM)+W_F\times FM). \quad [24]$$

where, $W_S$ is a weighting value derived from the spatial distribution of the defined tiles, and the other variables have their previous definitions. Thus, for instance, the weighting value $W_s$ can be defined to indicate the amount of clustering that occurs between defined motion and/or focus tiles within the video frame image. If there is a large number of defined tiles grouped into a sub-region of the frame, and the remaining sub-regions of the frame contains only undefined tiles, then the weighting $W_s$, and hence the quality metric, can be assigned a higher value.

In another alternative arrangement, each tile of a frame is assigned an "exposure" attribute. This attribute is assigned to a tile if that tile is undefined AND the mid-range luminance value MRV (see Equations [11] and [12]) of the tile falls within a predefined range of values. Over-exposed tiles typically exhibit a significant amount of saturated colour, and as a result, many pixel luminance values are close to white (a value of 255 for an 8-bit sample). Under-exposed tiles typically exhibit a significant amount of darkness, and as a result, many pixel luminance values close to black (a value of 0 for an 8-bit sample). In this arrangement, the quality metric value QM of each frame is dependent on the "exposure" attribute, along with the motion and focus metric and defined tile values.

In yet another alternative arrangement using the "exposure" attribute, the exposure attribute can be calculated based on statistics of the histogram values of some or all of the tiles in the frame. Thus, for example, corresponding bins of each tile histogram of a frame can be summed, and the resultant histogram analysed to ensure that there is a "significant" amount of data present in each bin. Too much data present in too few histogram bins would indicate a poor dynamic range of colour within the video frame. The exposure attribute need not be limited to calculations of luminance values only, but could be performed on other colour channels as well as, or in place of, the luminance component.

Suitable values for the aforementioned parameters are:
$W_T=16$
$H_T=16$
$T_N=5$
$T_M=20$
$T_H=235$
$T_W=20$
$R_T=16$
$N_b=16$
$MB_T=0.3$
$FB_T=0.55$
$T_{EM}=4.4$
$T_{UNKNOWN}=0.61$
$T_{BAD}=0.78$

INDUSTRIAL APPLICABILITY

It is apparent from the above that the arrangements described are applicable to the video processing industry.

The foregoing describes only some embodiments of the present invention, and modifications and/or changes can be made thereto without departing from the scope and spirit of the invention, the embodiments being illustrative and not restrictive.

The invention claimed is:

1. A method of determining a quality value of a frame, the method comprising the steps of:
   dividing the frame into a plurality of tiles;
   determining a motion magnitude for each said tile based upon (i) pixel values of the tile and (ii) pixel values of a corresponding tile of a preceding frame;
   determining a focus magnitude attribute for each tile of the plurality of tiles having a motion magnitude attribute below a predetermined threshold, the focus magnitude attribute being based on pixel values of the tile; and
   establishing the quality value of the frame by: (1) testing the motion and focus magnitude attributes of the frame against predetermined criteria; and (2) defining the quality value of the frame depending upon results of said testing.

2. A method according to claim 1, wherein if the tiles of the frame do not meet the criteria of the testing step, then the defining step defines a default quality value for the frame.

3. A method according to claim 1, wherein the pixel value comprises the luminance value of a pixel which is represented in one of YUV and YCbCr video color space.

4. A method according to claim 1, wherein:
   the frame is one of a sequence of video frames;
   the method is applied to each frame in the sequence; and
   the best frame in the sequence is identified as that frame having the best quality value.

5. A method according to claim 3, wherein the attributes comprise a motion definition state and a motion magnitude, these being determined by: (1) classifying the tile as having a motion defined state if one of (i) an intensity range of pixels in the tile or in the corresponding tile of the preceding frame exceeds a pre-determined luminance threshold; and (ii) a difference between mid-range pixel values for the tile and the corresponding tile of the preceding frame exceeds a pre-determined mid-range difference threshold; and (2) determining, if the tile has a motion defined state, the motion magnitude dependent upon a difference in pixel value distributions between a pixel value histogram of the tile and a pixel value histogram of the corresponding tile in the previous frame, and wherein the attributes further comprise a focus definition state and a focus magnitude, these being determined by: (1) classifying the tile as having a focus undefined state if (i) the intensity range of pixels in the tile is too small, or there is too much motion in the tile or (ii) the number of defined difference quotients in the tile is less than a threshold; and (2) determining the focus magnitude depending upon the largest difference quotient values of pixel luminance of the tile.

6. A method according to claim 5, wherein the pre-determined criteria are:
   (a) that the number of tiles in the frame having a motion defined state exceed a pre-defined motion defined threshold;
   (b) that the ratio of (i) tiles in the frame having a motion defined state whose motion magnitude exceeds a pre-defined motion threshold, to (ii) the total number of tiles in the frame having a motion defined state, exceeds a pre-defined motion defined threshold;
   (c) that the number of tiles in the frame having a focus defined state exceeds a pre-defined focus defined threshold; and
   (d) that the average of the largest focus magnitude values of tiles in the frame having a focus defined state exceeds a pre-defined focus defined threshold.

7. A method according to claim 6, wherein if the tiles of the frame meet all the criteria of the testing step, then the quality value depends upon the ratio and the average determined in the steps (b) and (d) of claim 6.

8. A method according to claim 1, wherein:
   the quality value is determined based upon a sub-region of the frame; and
   the dividing step divides the sub-region into the plurality of tiles.

9. A method according to claim 8, wherein the defining step is dependent upon a weight establishing the importance of the sub-region in the frame, and a weight establishing the size of the sub-region relative to the frame.

10. A method according to claim 6, wherein the criterion (b) is dependent upon the spatial location of tiles in the frame, and
   wherein the criterion (b) is that the ratio of (i) tiles in a pre-defined region of the frame having a motion defined state whose motion magnitude exceeds a pre-defined motion threshold, to (ii) the total number of tiles in the frame having a motion defined state, exceeds a pre-defined motion defined threshold.

11. A method according to claim 6, wherein the criterion (d) is dependent upon the spatial location of tiles in the frame, and
   wherein the criterion (d) is that the average of the largest focus magnitude values of tiles in the frame having a focus defined state exceeds a pre-defined focus defined threshold, wherein the focus magnitude values are weighted according to the relative distance of respective tiles from the center of the frame.

12. A method according to claim 7, wherein the quality value further depends upon a spatial distribution of the tiles having one of a motion defined state and a focus defined state.

13. An apparatus for determining a quality value of a frame, the apparatus comprising:
   means for dividing the frame into a plurality of tiles;
   means for determining a motion magnitude attribute for each said tile based upon (i) pixel values of the tile and (ii) pixel values of a corresponding tile of a preceding frame;
   means for determining a focus magnitude attribute for each tile of the plurality of tiles having a motion magnitude attribute below a predetermined threshold, the focus magnitude attribute being based on pixel values of the tile; and
   means for establishing the quality value of the frame comprising: (1) means for testing the motion and focus magnitude attributes of the frame against predetermined criteria; and (2) means for defining the quality value of the frame depending upon results of the testing.

14. A computer readable storage medium having a computer program recorded therein for directing a processor to execute a method of determining a quality value of a frame, said computer program comprising:
   code for dividing the frame into a plurality of tiles;
   code for determining a motion magnitude attribute for each said tile based upon (i) pixel values of the tile and (ii) pixel values of a corresponding tile of a preceding frame;
   code for determining a focus magnitude attribute for each tile of the plurality of tiles having a motion magnitude attribute below a predetermined threshold, the focus magnitude attribute being based on pixel values of the tile; and
   code for establishing the quality value of the frame comprising: (1) code for testing the motion and focus attributes of the frame against predetermined criteria; and (2) code for defining the quality value of the frame depending upon results of the testing.

15. A video frame selected from a sequence of video frames dependent upon a quality value of the frame, the frame being selected by a method of determining a quality value of a video frame, said method being applied to each frame in the sequence, said method comprising, in regard to a particular frame in the sequence, the steps of:
   dividing the frame into a plurality of tiles;
   determining a motion magnitude attribute for each said tile based upon (i) pixel values of the tile and (ii) pixel values of a corresponding tile of a preceding frame;
   determining a focus magnitude attribute for each tile of the plurality of tiles having a motion magnitude attribute below a predetermined threshold, the focus magnitude attribute being based on pixel values of the tile; and
   establishing the quality value of the frame by: (1) testing the motion and focus attributes of the frame against predetermined criteria; and (2) defining the quality value of the frame depending upon results of said testing.

16. A method of estimating quality of an image in a video, the video comprising a plurality of images, each image comprising a plurality of pixels, said method comprising the steps of:
   arranging, for a current image of the video, pixels of the current image into a plurality of tiles, each said tile containing a plurality of pixels;
   determining the number of the tiles of the current image having defined characteristics; and
   estimating quality of the current image based on the number of the tiles having the characteristics as a proportion of the number of tiles in the current image,
   wherein the characteristics are (a) a motion characteristic, determined for each tile, based upon (i) pixel values of the tile and (ii) pixel values of a corresponding tile, of a preceding image, and (b) a focus characteristic, determined for each tile having a motion characteristic below a predetermined threshold, the focus characteristic being based on pixel values of the tile, and wherein the motion characteristic establishes a motion magnitude in the tile, and the focus characteristic establishes a focus magnitude in the tile.

17. A method of selecting an image from a video comprising a plurality of images, each image comprising a plurality of pixels, wherein said method comprises the steps of:
(a) performing, for each image of the plurality of images, the steps of: (1) arranging pixels of the image into a plurality of tiles, each said tile containing a plurality of pixels; (2) determining the number of the tiles of the image having defined characteristics; and (3) estimating quality of the image based on the number of the tiles having the characteristics as a proportion of the number of tiles in the image; and
(b) selecting an image from the video in accordance with the estimated quality,
wherein the characteristics are (a) a motion characteristic, determined for each tile, based upon (i) pixel values of the tile and (ii) pixel values of a corresponding tile of a preceding image, and (b) a focus characteristic, determined for each tile having a motion characteristic below a predetermined threshold, the focus characteristic being based on pixel values of the tile, and
wherein the motion characteristic establishes a motion magnitude in the tile, and the focus characteristic establishes a focus magnitude in the tile.

18. A method according to claim 16 or claim 17, wherein the characteristic is dependent on luminance.

19. A method according to claim 16 or claim 17, wherein the tiles of the current image comprise a predetermined number of pixels NP.

20. A method according to claim 16 or claim 17, wherein the characteristic is an exposure characteristic.

21. A method according to claim 20, wherein the motion characteristic classifies a tile as either motion-defined or motion-undefined.

22. A method according to claim 20, wherein the motion characteristic establishes the motion magnitude in the tile if the tile is determined to be motion-defined.

23. A method according to claim 20, wherein the focus characteristic classifies a tile as either focus-defined or focus-undefined.

24. A method according to claim 20, wherein the focus characteristic establishes the focus magnitude in the tile if the tile is determined to be focus-defined.

25. A method according to claim 21, wherein determining the motion characteristics of a tile comprises the steps of:
obtaining, for each color channel of tile pixels, a respective range of sample values; and
setting a motion characteristic of the tile of the current image to indicate that the tile is motion-undefined if: (1) the color channel range of the tile of the current image does not exceed a color channel range threshold value, and (2) the color channel range of a corresponding tile of a previous image does not exceed the color channel range threshold value, and (3) the absolute difference between a color channel mid-range value of the tile of the current image and a corresponding color channel mid-range value of the corresponding tile of the previous image does not exceed a color channel mid-range difference threshold value; and, otherwise, setting the motion characteristic of the tile of the current image to indicate that the tile is motion-defined.

26. A method according to claim 24, wherein determination of the focus characteristic of a tile comprises the steps of:
generating, for each sample of said color channel, a difference quotient for the sample value in the horizontal and vertical directions; and
defining the focus magnitude of the tile to be equal to the maximum absolute value of the difference quotient values of the tile if the tile of the current image is focus-defined.

27. A method according to claim 16, wherein determining the proportion comprises the steps of:
determining the respective numbers of tiles in the image having respective good, bad, and unknown classifications;
determining an image metric value for the image; and
classifying the frame as being one of acceptable and unacceptable dependent upon (i) the respective numbers of tiles in the image having good, bad, and unknown classification and (ii) the image metric value.

28. A method according to claim 27, wherein the image metric value is an image motion metric value defined as the number of motion-defined tiles with a motion magnitude greater than a motion magnitude threshold value, normalized against the total number of motion-defined tiles.

29. A method according to claim 27, wherein the image metric value is an image focus metric value defined as the average of the focus magnitudes of focus-defined tiles with a focus magnitude greater than a focus magnitude threshold value.

30. A method according to claim 27, wherein the image metric value is an image exposure metric value dependent upon the entropy of the luminance values of the frame.

31. A method according to claim 16, wherein the quality of the current image is defined as the weighted contribution from motion, focus, and exposure characteristic values.

32. A method according to claim 31, wherein the quality of a current image is assigned a normalized value of 0.0 for the worst quality image, 1.0 for the best quality image, and corresponding intermediate values for images of intermediate quality.

33. A method according to claim 32, wherein the quality of a current image is classified as acceptable if any of the following criteria are satisfied:
the proportion of known tiles exceeds a first threshold value;
the proportion of good tiles exceeds a second threshold value; and
the exposure metric exceeds a third threshold value.

34. A method according to claim 15, wherein said selecting at least one image is determined by ranking quality metric values and selecting the highest value image as the best image.

35. A method of determining a quality value of a frame, the method comprising the steps of:
dividing the frame into a plurality of tiles;
determining attributes of each said tile based upon (i) pixel values of the tile and (ii) pixel values of a corresponding tile of a preceding frame, wherein the attributes comprise a motion definition state and a motion magnitude, the motion definition state being determined by classifying the tile as having a motion defined state if one of (i) an intensity range of pixels in the tile or in the corresponding tile of the preceding frame exceeds a predetermined luminance threshold and (ii) a difference between mid-range pixel values for the tile and the corresponding tile of the preceding frame exceeds a predetermined mid-range difference threshold, and determining the motion magnitude, if the tile has a motion defined state, based upon a difference in pixel value distributions between a pixel value histogram of the tile and a pixel value histogram of the corresponding tile in the previous frame; and establishing the quality value of the frame by: (1) testing the tile attributes of the frame against pre-determined criteria; and (2) defining the quality value of the frame depending upon results of said testing, wherein:

the frame is one of a sequence of video frames;

the method is applied to each frame in the sequence; and the best frame in the sequence is identified as that frame having the best quality value.

36. A method of determining a quality value of a frame, the method comprising the steps of:

dividing the frame into a plurality of tiles;

determining attributes of each said tile based upon pixel values of the tile, wherein the attributes comprise a focus definition state and a focus magnitude, the focus definition state being determined by classifying the tile as having a focus undefined state if (i) an intensity range of pixels in the tile is less than a predetermined threshold, or (ii) a number of defined difference quotients in the tile is less than a threshold, and determining the focus magnitude based on the largest difference quotient values of pixel luminance of the tile; and establishing the quality value of the frame by: (1) testing the tile attributes of the frame against pre-determined criteria; and (2) defining the quality value of the frame depending upon results of said testing, wherein:

the frame is one of a sequence of video frames;

the method is applied to each frame in the sequence; and the best frame in the sequence is identified as that frame having the best quality value.

* * * * *